(12) United States Patent
Zeineh et al.

(10) Patent No.: US 12,243,335 B2
(45) Date of Patent: *Mar. 4, 2025

(54) SYSTEMS AND METHODS TO LABEL STRUCTURES OF INTEREST IN TISSUE SLIDE IMAGES

(71) Applicant: Icahn School of Medicine at Mount Sinai, New York, NY (US)

(72) Inventors: Jack Zeineh, New York, NY (US); Marcel Prastawa, New York, NY (US); Gerardo Fernandez, New York, NY (US)

(73) Assignee: Icahn School of Medicine at Mount Sinai, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,762

(22) Filed: Mar. 27, 2024

(65) Prior Publication Data

US 2024/0233418 A1     Jul. 11, 2024

Related U.S. Application Data

(63) Continuation of application No. 17/605,943, filed as application No. PCT/US2020/028162 on Apr. 14, 2020, now Pat. No. 11,972,621.

(60) Provisional application No. 62/838,243, filed on Apr. 24, 2019.

(51) Int. Cl.
| | |
|---|---|
| *G06V 20/69* | (2022.01) |
| *G06T 7/00* | (2017.01) |
| *G06T 7/194* | (2017.01) |
| *G06T 7/30* | (2017.01) |
| *G06V 10/82* | (2022.01) |
| *G06V 20/70* | (2022.01) |

(52) U.S. Cl.
CPC .......... *G06V 20/698* (2022.01); *G06T 7/0012* (2013.01); *G06T 7/194* (2017.01); *G06T 7/30* (2017.01); *G06V 10/82* (2022.01); *G06V 20/70* (2022.01); *G06T 2200/24* (2013.01); *G06T 2207/30024* (2013.01)

(58) Field of Classification Search
None
See application file for complete search history.

(56) References Cited

U.S. PATENT DOCUMENTS

| | | |
|---|---|---|
| 10,043,054 B2 | 8/2018 | Remiszewski et al. |
| 11,972,621 B2 * | 4/2024 | Zeineh .............. G06F 18/24133 |
| 2011/0286654 A1 | 11/2011 | Krishnan |
| 2012/0076390 A1 | 3/2012 | Potts et al. |
| 2013/0089249 A1 | 4/2013 | Mueller et al. |
| 2017/0091937 A1 | 3/2017 | Barnes et al. |
| 2020/0372235 A1 | 11/2020 | Peng |

FOREIGN PATENT DOCUMENTS

WO     WO 2018/115055      6/2018

OTHER PUBLICATIONS

"Extended European Search Report in EP Application No. 20795913.1", Apr. 25, 2023, 11 pages.

(Continued)

*Primary Examiner* — Leon Flores
(74) *Attorney, Agent, or Firm* — IP Spring

(57) ABSTRACT

Systems and methods to label structures of interest in tissue slide images are described.

20 Claims, 10 Drawing Sheets

(56) References Cited

OTHER PUBLICATIONS

"International Preliminary Report of Patentability in PCT/US2020/0128162", Nov. 4, 2021, 11 Pages.
"International Search Report and Written Opinion in International Application No. PCT/US2020/028162", Jul. 21, 2020.
Wouter Bulten, et al., "Epithelium segmentation using deep learning in H&E-stained prostate specimens with immunohistochemistry as reference standard," arxiv.org, Cornell University Library, 201 Olin Library Cornell University Ithaca, NY 14853, Aug. 17, 2018.

* cited by examiner

SYSTEMS AND METHODS TO LABEL STRUCTURES OF INTEREST IN TISSUE SLIDE IMAGES

CROSS REFERENCE TO PRIOR APPLICATIONS

This application is a continuation of U.S. patent application Ser. No. 17/605,943, filed Oct. 22, 2021, which is a § 371 national stage of PCT International Application No. PCT/US20/28162, filed Apr. 14, 2020, claiming the benefit of U.S. Provisional Application No. 62/838,243, filed Apr. 24, 2019, the contents of which is incorporated herein by reference in its entirety.

BACKGROUND

Computer vision technology has long been an interest in the field of biomedical imaging. Analysis of tissue samples, in particular, can often be tedious, weakly quantitative, and difficult to reproduce due to the vast quantities of data that need to be analyzed. Recently, machine learning based computer vision systems in other fields have achieved performance levels that suggest that significant improvements can be realized in biomedical imaging. However, these learning based systems often require input data that contains labels designating the items of interest.

The volume of labeled samples needed to train a machine learning system can be quite large compared to what a human may need in order to be trained. Generating large quantities of labeled data can be daunting for an unassisted human. For example, to generate labels that separate epithelial regions from stromal regions, a user manually traces a mask image to delineate the epithelial regions in order to separate those from the stromal regions. In addition to being laborious, a manual process is error prone due to challenges in accurately and reproducibly determining the epithelial boundary.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to biomedical image processing, and in particular, to systems and methods to label structures of interest in tissue slide images.

Some implementations can include a method, computer readable medium, and/or system to label structures of interest in tissue slide images. Some implementations can provide more accurate and more efficient generation of the labels for images compared to some conventional techniques. In some implementations, the labeled images can be used as training data for a machine learning model constructed to identify structures of interest in tissue slide images.

Some implementations can include a computer-implemented method to label structures in tissue slide images. The method can include scanning one or more stained tissue slides to generate a plurality of tissue slide images including a first tissue slide image of a first tissue slide stained with a first stain and a second tissue slide image of the first tissue slide stained with a second stain, wherein the first stain and the second stain have a common attribute. The method can also include preprocessing the plurality of tissue slide images, and performing an image registration process on the plurality of tissue slide images, wherein the image registration process is performed on the plurality of tissue slide images using an image of the common attribute in each of the plurality of tissue slide images.

The method can further include identifying one or more candidate regions of interest (ROI) within the plurality of tissue slide images, and generating one or more label annotations for structures within the plurality of tissue slide images. In some implementations, the first stain includes hematoxylin and eosin, and the second stain includes an immunohistochemistry (IHC) marker.

In some implementations, preprocessing the plurality of tissue slide images includes separating foreground structures from background structures in the plurality of tissue slide images, and unmixing color of the plurality of tissue slide images to separate components of the first stain and the second stain into different channels. The method can also include for the tissue slide images stained with the first stain, separating a hematoxylin channel from an eosin channel, for the tissue slide image stained with the second stain, separating a hematoxylin channel from a DAB channel.

In some implementations, the image registration process includes minimizing a mutual information metric between deconvolved hematoxylin channels for images of slides stained with the first stain and images of slides stained with the second stain, where the minimizing is performed in two stages: at a first stage, performing a coarse, low-resolution registration of hematoxylin channels using global rigid and affine transforms; and at a second stage, performing a high resolution registration of localized fields using affine and B-spline transforms. In some implementations, identifying the one or more candidate regions of interest includes creating a registered image for a same tissue area, wherein the registered image includes the first tissue slide image and the second tissue slide image aligned for the same tissue area.

The method can further include providing the tissue slide images and the one or more label annotations for structures within the plurality of tissue slide images to a reviewer system graphical user interface (GUI), and receiving updated labels or updated comments from the reviewer system GUI. The method can also include storing the updated labels or updated comments with corresponding tissue slide images, and providing labeled tissue slide images as training data to a model.

Some implementations can include a system comprising one or more processors coupled to a computer readable memory having stored thereon software instructions that, when executed by the one or more processors, cause the one or more processors to perform or control performance of operations. The operations can include scanning one or more stained tissue slides to generate a plurality of tissue slide images including a first tissue slide image of a first tissue slide stained with a first stain and a second tissue slide image of the first tissue slide stained with a second stain, wherein the first stain and the second stain have a common attribute. The operations can also include preprocessing the plurality of tissue slide images, and performing an image registration process on the plurality of tissue slide images, wherein the image registration process is performed on the plurality of tissue slide images using an image of the common attribute in each of the plurality of tissue slide images.

The operations can further include identifying one or more candidate regions of interest (ROI) within the plurality of tissue slide images, and generating one or more label annotations for structures within the plurality of tissue slide images. In some implementations, the first stain includes hematoxylin and eosin, and the second stain includes an immunohistochemistry (IHC) marker.

In some implementations, the preprocessing the plurality of tissue slide images includes separating foreground structures from background structures in the plurality of tissue slide images, and unmixing color of the plurality of tissue slide images to separate components of the first stain and the second stain into different channels. The operations can further include for the tissue slide images stained with the first stain, separating a hematoxylin channel from an eosin channel, for the tissue slide image stained with the second stain, separating a hematoxylin channel from a DAB channel.

In some implementations, the image registration process includes: minimizing a mutual information metric between deconvolved hematoxylin channels for images of slides stained with the first stain and images of slides stained with the second stain, where the minimizing is performed in two stages: at a first stage, performing a coarse, low-resolution registration of hematoxylin channels using global rigid and affine transforms; and at a second stage, performing a high resolution registration of localized fields using affine and B-spline transforms. In some implementations, identifying the one or more candidate regions of interest includes: creating a registered image for a same tissue area, wherein the registered image includes the first tissue slide image and the second tissue slide image aligned for the same tissue area.

The operations can also include providing the tissue slide images and the one or more label annotations for structures within the plurality of tissue slide images to a reviewer system graphical user interface (GUI), and receiving updated labels or updated comments from the reviewer system GUI. The operations can further include storing the updated labels or updated comments with corresponding tissue slide images, and providing labeled tissue slide images as training data to a model.

Some implementations can include a non-transitory computer readable medium having software instruction stored thereon that, when executed by a processor, cause the processor to perform or control performance of operations. The operations can include scanning one or more stained tissue slides to generate a plurality of tissue slide images including a first tissue slide image of a first tissue slide stained with a first stain and a second tissue slide image of the first tissue slide stained with a second stain, wherein the first stain and the second stain have a common attribute. The operations can also include preprocessing the plurality of tissue slide images, and performing an image registration process on the plurality of tissue slide images, wherein the image registration process is performed on the plurality of tissue slide images using an image of the common attribute in each of the plurality of tissue slide images.

The operations can further include identifying one or more candidate regions of interest (ROI) within the plurality of tissue slide images, and generating one or more label annotations for structures within the plurality of tissue slide images. In some implementations, the first stain includes hematoxylin and eosin, and the second stain includes an immunohistochemistry (IHC) marker.

In some implementations, the preprocessing the plurality of tissue slide images includes separating foreground structures from background structures in the plurality of tissue slide images, and unmixing color of the plurality of tissue slide images to separate components of the first stain and the second stain into different channels. The operations can further include for the tissue slide images stained with the first stain, separating a hematoxylin channel from an eosin channel, for the tissue slide image stained with the second stain, separating a hematoxylin channel from a DAB channel.

In some implementations, the image registration process includes: minimizing a mutual information metric between deconvolved hematoxylin channels for images of slides stained with the first stain and images of slides stained with the second stain, where the minimizing is performed in two stages: at a first stage, performing a coarse, low-resolution registration of hematoxylin channels using global rigid and affine transforms; and at a second stage, performing a high resolution registration of localized fields using affine and B-spline transforms. In some implementations, identifying the one or more candidate regions of interest includes: creating a registered image for a same tissue area, wherein the registered image includes the first tissue slide image and the second tissue slide image aligned for the same tissue area.

The operations can also include providing the tissue slide images and the one or more label annotations for structures within the plurality of tissue slide images to a reviewer system graphical user interface (GUI), and receiving updated labels or updated comments from the reviewer system GUI. The operations can further include storing the updated labels or updated comments with corresponding tissue slide images, and providing labeled tissue slide images as training data to a model.

Some implementations can include a system having one or more hardware processors configured to perform or control performance of the method mentioned above. In some implementations, the one or more hardware processors may include a graphics processing unit (GPU) with a large number of processing units. In some implementations, the hardware processor may include a neural network processor. The system can include an imaging system.

Some implementations can include a non-transitory computer readable medium having software instruction stored thereon that, when executed by a processor, cause the processor to perform or control performance of operations according to the method mentioned above.

DETAILED DESCRIPTION

Figure 1:
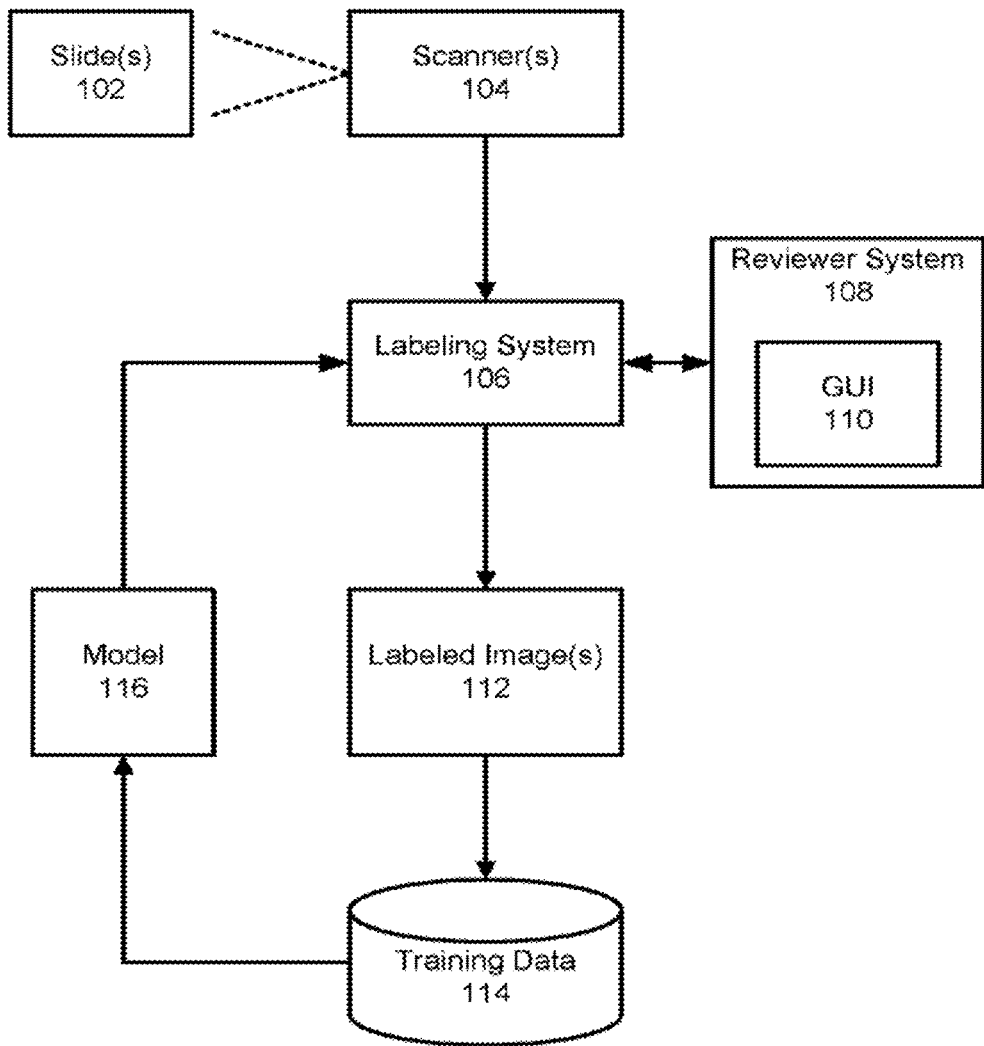
FIG. 1 is a diagram of an example tissue slide image labeling environment in accordance with some implementations.

A need may exist for a system that makes this process of generating labeled data less labor intensive and more accurate. Some implementations were conceived in light of the above-mentioned problems, needs, and limitations, among other things.

Some implementations include a method to label structures of interest in tissue slide images. The method can include staining a specimen on a slide with hematoxylin and eosin (H&E). The H&E stained slide is then imaged with a scanner (e.g., a Philips Ultrafast scanner). The slide is then destained and stained with at least one antibody of interest that is capable of marking the structures of interest (e.g., using an immunohistochemistry or IHC marker technique). After IHC staining is complete, the IHC image is scanned on a scanner. The staining and scanning yield two images: an H&E slide image and an IHC slide image.

The image of the H&E slide and the corresponding IHC slide are then supplied to an image preprocessing operation. This operation can involve multiple sub-operations. An example first sub-operation is separating foreground from background. After separating foreground from background, color unmixing to separate, into different channels, each of the stains can be done. In the H&E slide, color unmixing can involve separation of the hematoxylin from the eosin. In the case of the IHC slide, color unmixing can include separation of the hematoxylin from the 3,3'-Diaminobenzidine (DAB), or other similar IHC stain components.

Separation of images into color components enables the next operation of processing, registration. Since both images share a hematoxylin channel, this channel can be used to register the images. Multiple registration techniques can be used. For example, mutual information can be used for registration.

Candidate regions of interest (ROI) can then be extracted from the slide to create a registered H&E and IHC image for the same tissue area. This region of interest extraction or identification can be done manually by a technician or a pathologist by manually selecting a field from the image. The extraction can also be done automatically by a computer in addition to or as an alternative to manual region of interest extraction.

The automatic computerized region of interest identification can be guided multiple ways, such as by utilizing heuristics. An example can include having a pathologist pre-label the areas of tumor on a slide. The computer system can then randomly sample areas inside the tumor and outside the tumor so that a predetermined ratio of tumor to non-tumor regions can be extracted.

Additional intelligence can be added to the above process to select regions most likely to contain valuable data. For example, if one were looking for mitotic figures and the user was using a mitotic figure stain such as phosphohistone (PHH3), the system could incorporate information looking for the highest density of PHH3 on the slide. This technique would likely generate the greatest amount of mitotic figures for a given slide image.

Another technique can be based on a machine learning model technique. An example would be training a convolutional neural network (CNN) to select candidate ROIs based upon an available training set of selected and not selected ROIs based on human input.

Raw IHC images often do not directly translate into binary labels for objects of interest. IHC images are processed in order to produce object labels. This processing can vary depending on the IHC label used. For a cytoplasmic stain that is attempting to delineate specific cellular compartments such as epithelium in the case of cytokeratin 18 (CK18), a segmentation technique such as level set segmentation can be used.

Figure 7:
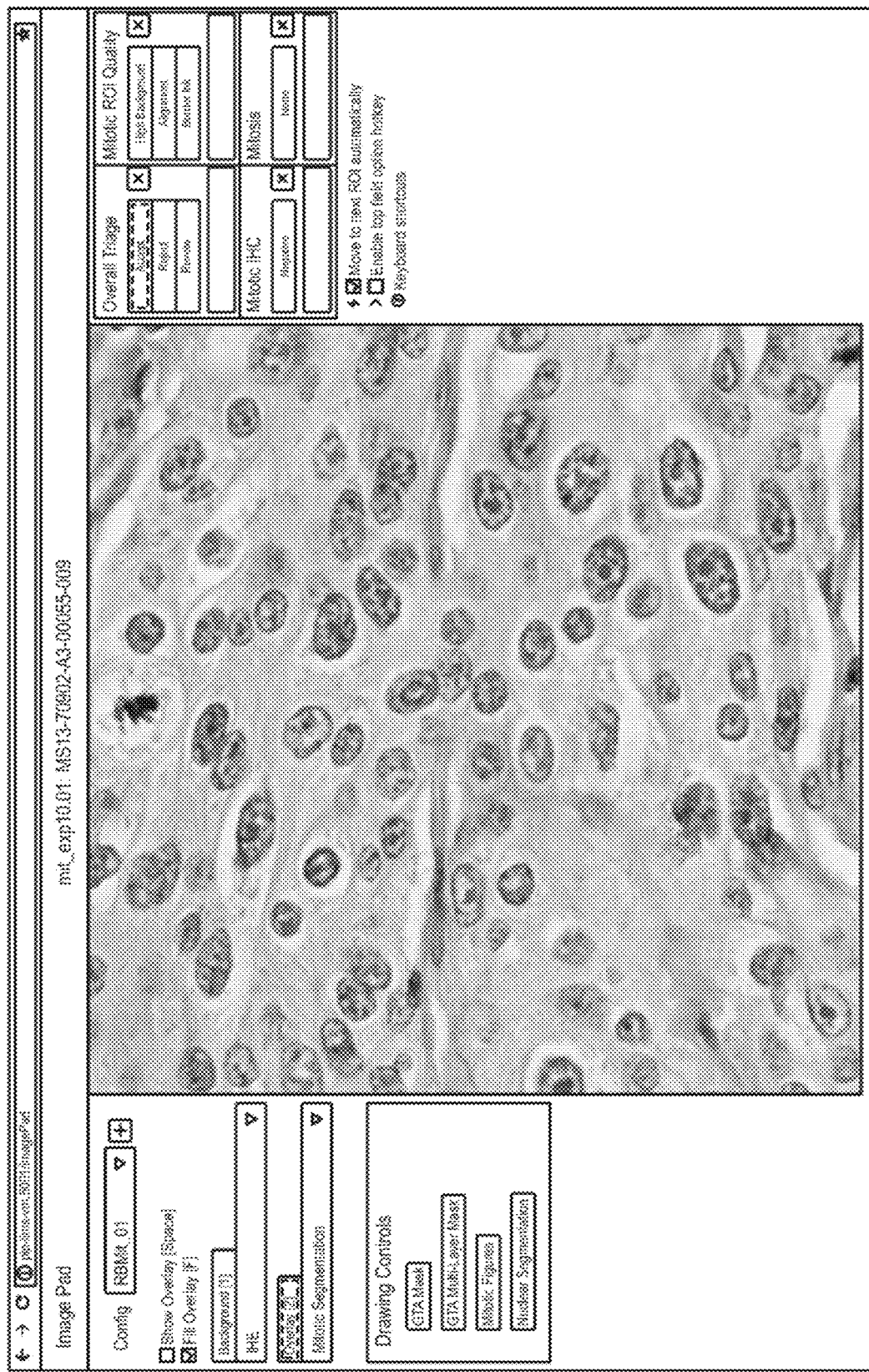
FIG. 7 is a diagram of an example graphical user interface for tissue slide image labeling review in accordance with some implementations.
Figure 8:
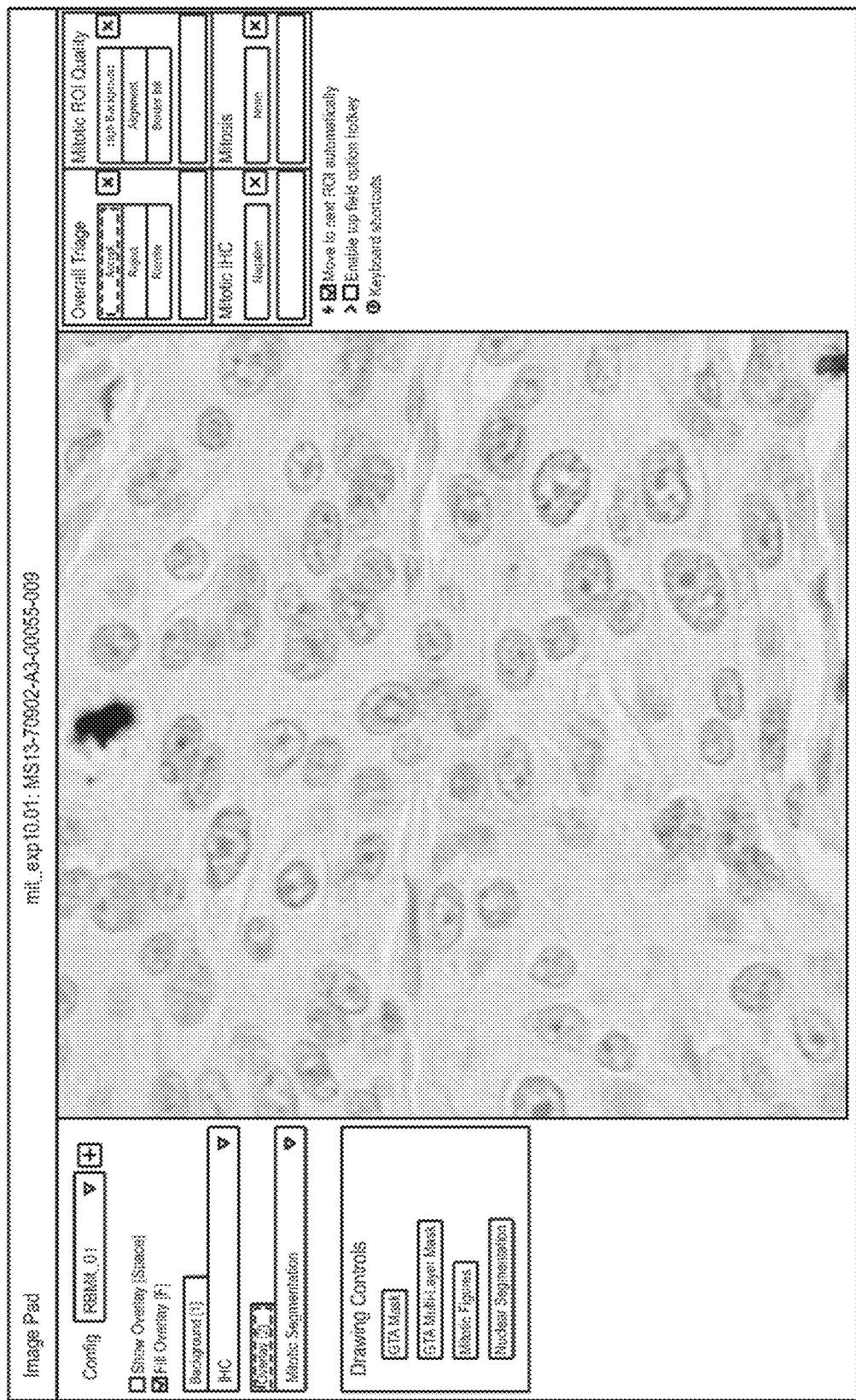
FIG. 8 is a diagram of an example graphical user interface for tissue slide image labeling review in accordance with some implementations.

With the aforementioned operations complete, an efficient process of human review can be undertaken. For example, in an implementation, the user is able to quickly switch between registered H&E and IHC images for the same area of tissue. In FIG. 7 and FIG. 8, respectively, an H&E slide image for a sample of breast tissue is displayed along with an IHC slide image of PHH3 for detecting mitotic figures.

Some implementations can also provide for a quick multiclass and multilabel system for each ROI. For example, in the graphical user interfaces (GUIs) shown in FIG. 7 and FIG. 8, the user can label an overall triage for the image, including Accept, Reject, or Review. They can also comment on the quality of the ROI and the IHC. In addition, the user can quickly comment if there is no mitosis. Furthermore, for fields displayed in the GUI, the user can enter in freetext comments that allow the user to create new labels on demand.

Some implementations can include receiving annotations on automatically generated fields using a web-based interface. In some implementations, an expert can confirm, correct, or add information using one or more of the following labels: a) Abnormal Mitotic; b) Mitotic; c) Borderline; d) Regular Nucleus; e) Look Alike; f) Artifact (e.g., hematocyrin); g) Telophase 1; h) Telophase 2; and/or i) Error (e.g., bad staining, algorithm error/bug). Automatic field annotations can be combined with annotation and processed to generate ground truth and validation data. Some implementations can provide near interactive integration of annotations using on-line/incremental learning.

FIG. 1 is a diagram of an example tissue slide image labeling environment 100 in accordance with some implementations. The environment 100 includes one or more slides 102 (e.g., slides prepared with H&E, an IHC marker, or the like) and one or more scanners 104 arranged to scan the slides 102. The scanners 104 are coupled to a labeling system 106, which is also coupled to one or more reviewer systems 108 that can each include a graphical user interface (GUI) 110.

The environment 100 also includes one or more labeled images 112 output by the labeling system 106 and provided to a training data store 114 that contains training data for a machine learning model 116 that is trained (or being trained) to perform labeling of structures within tissue slide images. In operation, the labeling system 106 performs tissue slide image labeling of structures of interest (e.g., epithelia and/or stroma, etc.) according to FIGS. 2-6 described below.

Figure 2:
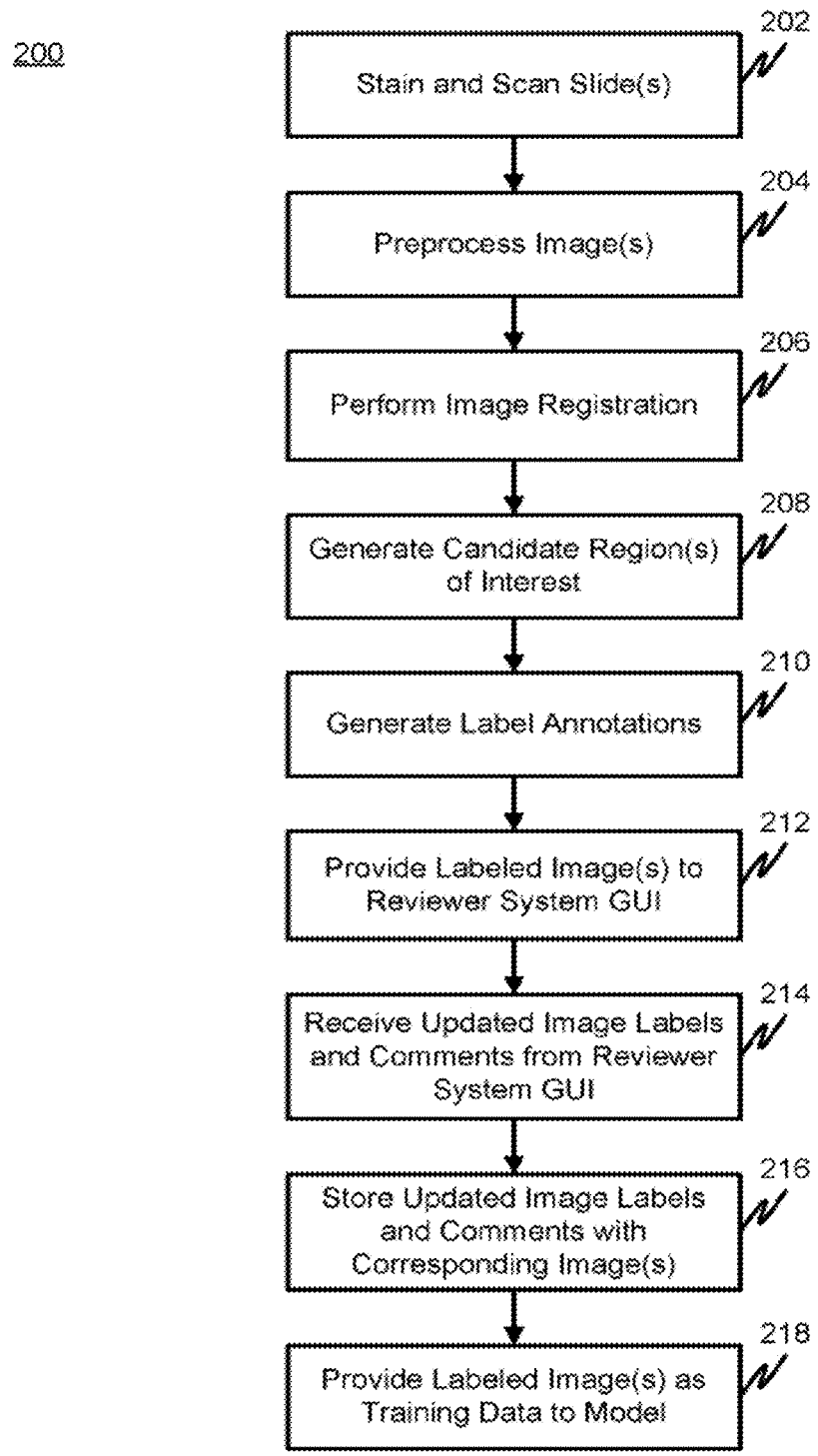
FIG. 2 is a flowchart of an example method for tissue slide image labeling in accordance with some implementations.

FIG. 2 is a flowchart of an example method for tissue slide image labeling in accordance with some implementations. Processing begins at 202, where one or more slides (e.g., 102) are stained and scanned. For example, a specimen on a slide is stained with hematoxylin and eosin (H&E). The H&E slide is then imaged or scanned with a scanner (e.g., 104) such as a Philips Ultrafast scanner. The H&E slide is then destained and IHC stained with at least one antibody of interest that is capable of marking the structures of interest.

After IHC staining is complete, the IHC slide is scanned on a scanner. Processing continues to 204.

At 204, the slide images are preprocessed. For example, the H&E slide image and the corresponding IHC slide image are preprocessed (e.g., using the labeling system 106), which can include multiple sub-operations. An example first sub-operation is separating foreground from background. After separating foreground from background, color unmixing is performed to separate into different channels each of the stains can be done. In the H&E slide, this would involve separation of the hematoxylin from the eosin. In the case of the IHC slide, this would involve separation of the hematoxylin from the DAB (or other similar IHC stain components).

In some implementations, efficient analysis of large whole slide images can be conducted by isolating relevant tissue from background. This isolation or separation can be accomplished by measuring textural content through derivative filters, such as a Laplacian filter. Analysis can be constrained to regions with Laplacian values larger than the average over the image. Structural signatures can be detected by separating or deconvolving the stains from the color images. Relevant signatures include hematoxylin stain channel images from H&E and IHC for registering the slide pairs, and structure-specific stains in IHC for generating annotations. Processing continues to 206.

At 206, image registration is performed to align the whole slide H&E images and the IHC images. Separation of images into color components helps enable registration. Because both images share a hematoxylin channel, the hematoxylin channel image can be used to register the images. Multiple registration technologies can be used. In some implementations, mutual information can be used for registration. In some implementations, registration of H&E and IHC images can be performed by maximizing the mutual information metric between the deconvolved hematoxylin channels, and performed in two stages. The first stage can include a coarse, low-resolution registration of hematoxylin channels using global rigid and affine transforms. The second stage can include a high resolution registration of localized H&E and IHC fields using affine and B-spline transforms, which can be performed at a whole slide level. Processing continues to 208.

At 208, candidate regions of interest are generated or identified within the slide images. For example, candidate regions can be extracted from the slide images to create a registered H&E and IHC image for the same tissue area. In some implementations, region (or field) extraction can be done manually by a technician or a pathologist manually selecting a field from the image. In some implementations, region extraction can be done automatically by a computer system (e.g., labeling system 106).

The computerized region extraction can be guided multiple ways. For example, one technique may include utilizing heuristics. For example, a pathologist could prelabel areas of tumor on a slide. The labeling system would then randomly sample areas inside the tumor and outside the tumor so that a predetermined ratio of tumor/non-tumor regions would be extracted. Additional intelligence or program logic can be added to this process to select regions most likely to contain valuable data. For example, if one were looking for mitotic figures and the user was using a mitotic figure stain such as PHH3, the algorithm could incorporate information looking for the highest density of PHH3 on the slide, which would emphasize generating mitotic figures. Yet another algorithm could be based on a machine learning technique (e.g., using model 116 and training data 114). An example would be training a CNN (e.g., 116) to select regions of interest based upon an available training set (e.g., 114) of selected and not selected regions of interest based on human input. Additional detail about identifying and extracting regions of interest is described below in connection with FIG. 3. Processing continues to 210.

At 210, label annotations are automatically generated. For example, raw IHC images often do not directly translate into binary labels for objects of interest. IHC images are processed in order to produce object labels. This processing can vary depending on the IHC label used. For a cytoplasmic stain that is attempting to delineate specific cellular compartments such as epithelium in the case of CK18, a segmentation technique such as level set segmentation can be used to segment the image and provide areas for labeling. Labeling of the segments can be provided by a machine learning model (e.g., 116).

Once candidate regions of interest are detected in the H&E slide, the system can automatically generate segmentation masks for the local fields. These segmentation masks can serve as a starting point for manual correction, reducing the workload for human reviewers. The system also registers the corresponding IHC ROI using a higher order model (e.g., B-splines). Human reviewers are presented with the H&E ROI, IHC ROI, and the automatically generated masks when performing the annotation.

In some implementations, masks can be generated by applying signal enhancement and suppression followed by image thresholding to select desired structures. Mitotic figure masks can be generated by enhancing blobby structures and suppressing ridges using the following equation:

$$s(x) = s(x) + (\text{blob}(s(x)) - \text{ridge}(s(x))) * \text{epsilon}$$

Cytokeratin masks can be generated by enhancing regions with high nearby hematoxylin and suppressing ridges using the following equation:

$$s(x) = s(x) + [\text{expand}(s(x)) * \text{hematoxylin}(x) - \text{ridge}(s(x))] * \text{epsilon}$$

In some implementations, the final mask for epithelium can be generated using the signal enhancement followed by clustering using Gabor feature filters, and random walker segmentation.

Additional details about a segmentation implementation are described below in connection with FIG. 4. Processing continues to 212.

Figure 9:
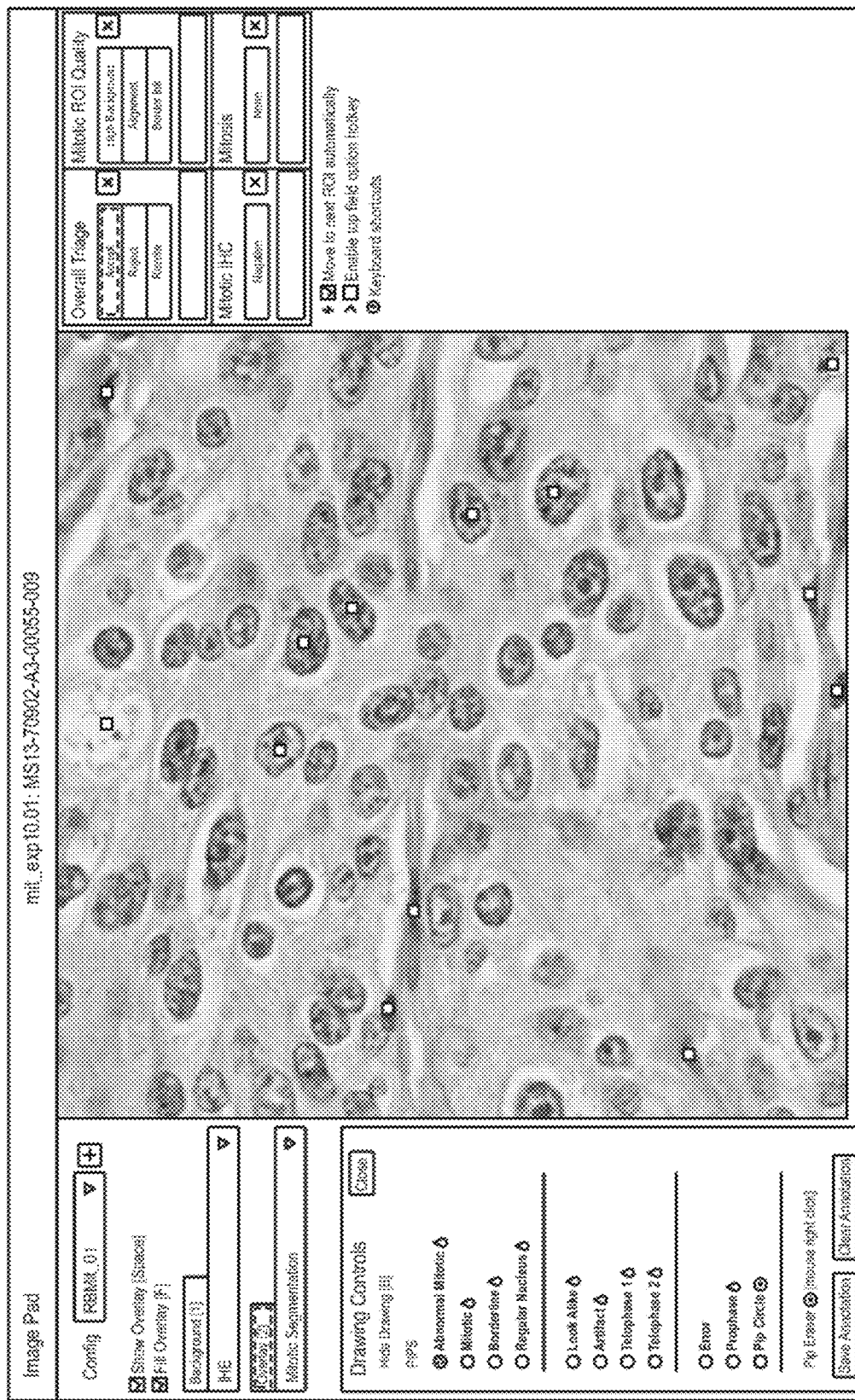
FIG. 9 is a diagram of an example graphical user interface for tissue slide image labeling review in accordance with some implementations.

At 212, the automatically labeled images can optionally be provided to a reviewer system (e.g., 108) and displayed within a GUI (e.g., 110) and as shown in FIGS. 7-9 and described below. The GUI can display the image(s), the automatically generated labels and structural identifications within the image and can provide an interface for a reviewer to add, delete or modify labels and/or comments corresponding to the image(s) being displayed. Processing continues to 214.

At 214, the labeling system can receive updated image labels and comments from the reviewer system GUI. Once the automatically generated masks have been corrected and reviewed by a clinical expert, the system generates image data with the associated labels for building models through the use of machine learning techniques.

Cell annotations, such as the one for mitotic figures, can be performed in multiple stages. At the first stage, the generated regions of interest are reviewed by non-clinicians for obvious errors, and possible mitotic figures are marked (e.g., as solid dark blue cells). In the second stage local image patches are presented at the marked locations to clinical experts for cell categorization. The third stage involves the outlining of the cells marked as mitotic or borderline mitotic. The per-pixel labeling of mitotic figures can be used to sample local patches for machine learning.

Boundary annotations, such as the one for epithelium, can be performed by presenting a non-clinician with the H&E and IHC images outlined using the technique described above. Non-clinicians could correct these outlines by drawing or erasing boundaries, they can also correct by using a paint filling method. To handle slides with significant variability of image appearance due to the staining process, the system may apply stain normalization to standardize the H&E image samples. Processing continues to 216.

At 216, the updated labels and comments are stored with the corresponding image(s). Processing continues to 218.

At 218, the labeled image(s) with updated labels and comments are optionally provided to a machine learning system for training and/or feedback. The model can include a neural network such as a convolutional neural network or fully convolutional neural network. A neural network can include a hierarchical composite of multiple primary processing units called neurons. Contrary to the conventional multiple-layer perceptions (MLPs), where each neuron is directly collected to all neurons in a previous layer, a convolutional neural network (CNN) assumes the input as images and exploits spatially local correlation by enforcing a local connectivity pattern between neurons of adjacent layers.

The trained CNN can then be applied in multiple ways. In a basic trained form, the trained CNN can be used on a given ROI to detect the likely mitotic figure candidates. Also, it is possible to use the trained CNN as a hotspot detector over the whole slide where the most likely candidates are located over the entire slide. Additional training or network modification may be needed for the trained CNN to operate on an entire slide, as the trained data set typically excludes extraneous and non-tumor tissue on the slide.

Blocks 202-218 (as well as any other blocks shown and described herein) can be repeated in whole or in part and performed in the same or different orders. Moreover, certain blocks can be eliminated, modified, combined with other blocks, and/or supplemented with other operations.

Figure 3:
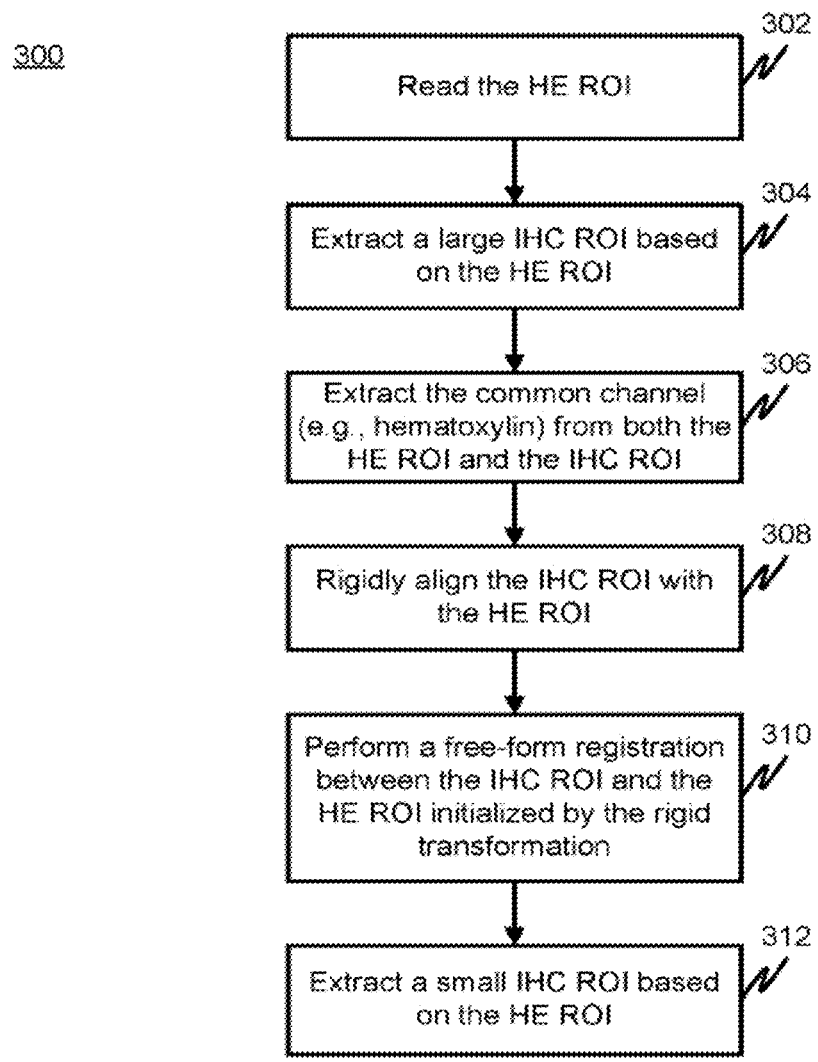
FIG. 3 is a flowchart of an example method for tissue slide image labeling in accordance with some implementations.

FIG. 3 is a flowchart of an example method for tissue slide image labeling in accordance with some implementations. Processing begins at 302, where the H&E ROI is read (e.g., as a 2000×2000 pixel section). Processing continues to 304.

At 304, a large IHC ROI is extracted based on the H&E ROI. For example, assuming that IHC and HE whole slides are rigidly aligned in a lower resolution, the position of the H&E ROI (in the highest resolution) can be read and a (4000×4000 pixel) IHC ROI extracted from the whole slide. The H&E ROI is roughly located in the center of the IHC ROI now. Processing continues to 306.

At 306, a common channel (e.g., hematoxylin) is extracted from both the H&E ROI and IHC ROI. Processing continues to 308.

At 308, the common channels of H&E and IHC images are rigidly aligned. For example, the IHC hematoxylin channel image (with bigger ROI) is rigidly aligned with the hematoxylin H&E channel image (with smaller ROI). Registration can be performed in a three-level multi-resolution approach (4, 2, and 1 times the actual spacing of the image) initialized by geometrical centered transform. Processing continues to 310.

At 310, a free-form registration between the IHC ROI and the H&E ROI is performed. For example, a free-form registration between IHC hematoxylin channel image and H&E hematoxylin channel image is initialized by the rigid transformation obtained in 308. A three-level, multi-resolution b-spline based registration can be used for deformation compensation between the IHC and H&E ROIs. In some implementations, a mutual information metric can be used that measures statistical similarity between the information content between images in both rigid and free-form registration. In particular, some implementations can include using the efficient Mattes Mutual Information metric that performs binning of image intensities and random sampling of pixel data. (Sec, D. Mattes, D. R. Haynor, H. Vesselle, T. K. Lewellen, and W. Eu-bank, "PET-CT image registration in the chest using free-form deformations," IEEE Trans. Med. Imag., vol. 22, no. 1, pp. 120-128, January 2003, which is incorporated herein by reference). Processing continues to 312.

At 312, after registration, a smaller IHC ROI (e.g., 2000×2000) corresponding to the H&E ROI is extracted and saved.

Figure 4:
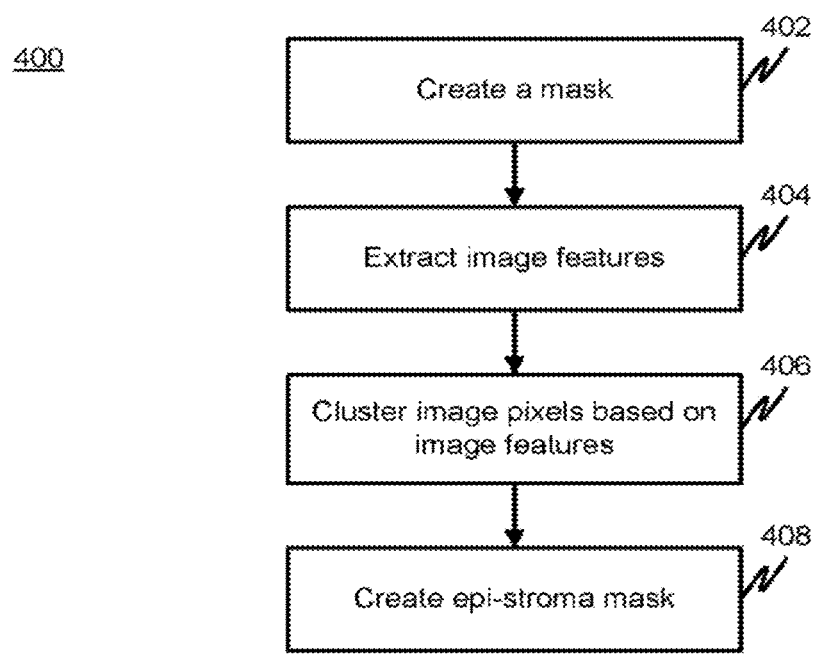
FIG. 4 is a flowchart of an example method for tissue slide image labeling in accordance with some implementations.

FIG. 4 is a flowchart of an example method for tissue slide image labeling in accordance with some implementations. Processing begins at 402, where a mask is created (e.g., an ini_mask). For example, the mask can provide an estimation of epithelial cells and separate the background from the tissue. For example, the mask can be created from the H&E hematoxylin image and the IHC DAB image using a signal enhancement approach, where known properties (e.g., "blobbiness" of a cell, smooth contiguous regions for glands, etc.) can be enhanced. The mask can be dilated to give a rough estimation of epithelium and separate the background from the tissue. Processing continues to 404.

At 404, image features are extracted. For example, image features can be extracted from one or more smaller IHC ROI images and the features can include:
1) H&E channel values in the H&E image (e.g., H&E hematoxylin and H&E cosin channels)
2) IHC hematoxylin and DAB channels
3) Local binary patterns computed for hemo_HE, eosin_HE, hemo_IHC, and dab_IHC. (See, T. Ojala, M. Pietikäinen, and D. Harwood (1996), "A Comparative Study of Texture Measures with Classification Based on Feature Distributions", Pattern Recognition, vol. 29, pp. 51-59, which is incorporated herein by reference).
4) Texture features based on Gabor filter banks. (See, Grigorescu, S. E., Petkov, N. and Kruizinga, P., 2002. Comparison of texture features based on Gabor filters. IEEE Transactions on Image processing, 11(10), pp. 1160-1167, which is incorporated herein by reference).

The above features can be computed for the hemo_HE, cosin_HE, hemo_IHC, and/or dab_IHC in one frequency and three different rotation angles (e.g., 0, 45, and/or 135 degrees). In some implementations, a total number of 20 features are computed for each pixel, constructed from different combinations of derivative values in different angular directions and at different spatial scales. These features capture patterns such as peaks and valleys in different directions and different sizes, enabling registration based on cellular boundaries and chromatin content. Processing continues to 406.

At 406, image pixels are clustered based on image features. For example, pixels in the ROI can be assigned to one of three clusters (e.g., nuclei (or cells), tissue, and background) using k-means clustering approach. Processing continues to 408.

At 408, a mask (e.g., an epi-stroma mask) is created. In some implementations, the epi-stroma mask can include identification of epithelium and stroma regions within one or more images, which can be useful because areas of cancer are sometimes associated with epithelium. In some implementations, the mask can be generated using a random walker technique, which is a semi-supervised segmentation method that involves a number of pixels with known labels (called seeds), can be used to perform image segmentation. The random walk process starts from these seeds.

The clustering process in the previous operation basically divides the pixels to three groups: 1) nuclei (cells); 2) tissue; and 3) background. However, the groups are not labeled. The system first determines the background cluster, which can include the cluster having the least overlap (correlation) with the ini_mask (created at 402). Then, for the remaining two clusters (label_1 and label_2) (e.g., nuclei and tissue), the system may consider pixels that lay within the ini_mask. Two different masks can be created using the random walker segmentation. In the first mask, an eroded version of label_1 can be used for seeding and a dilated version of label_2 can be used as unknown background. In the second mask, labels can be switched. From the created output masks, the mask having larger average dab_IHC in the overlapping pixels is chosen as the output epi-stroma mask, which can be output as an initial ground truth reference that can be utilized in downstream processing and/or corrected by user in some implementations.

Some implementations can include a software application for specialized medical equipment (e.g., slide scanning systems, etc.), desktop computers, laptop computers, and mobile devices (e.g., smartphones, tablet computing devices, etc.) that can be used by physicians and/or other health care or biomedical professionals to perform tissue slide image structure labeling. The software application can also be provided as a web service accessible over a wired or wireless computer network.

In some implementations, the method, or portions of the method, can be initiated automatically by a device. For example, the method (or portions thereof) can be repeatedly performed or performed based on the occurrence of one or more particular events or conditions. For example, such events or conditions can include: obtaining one or more images that have been newly captured by, uploaded to, or otherwise accessible by a device (e.g., an imaging device such as a slide scanner as described herein), a predetermined time period having expired since the last performance of method 200, 300, and/or 400, and/or one or more other events or conditions occurring which can be specified in settings of a device implementing method 200, 300, and/or 400. In some implementations, such conditions can be previously specified by a user in stored custom preferences of the user (accessible by a device or method with user consent). In another example, an imaging device (e.g., slide scanner) or other medical system can capture one or more images and can perform the method 200, 300, and/or 400. In addition, or alternatively, an imaging device can send one or more captured images to an external system (e.g., a cloud computing system, a server, a mobile device, etc.) over a network, and the external system can process the images using method 200, 300, and/or 400.

Figure 5:
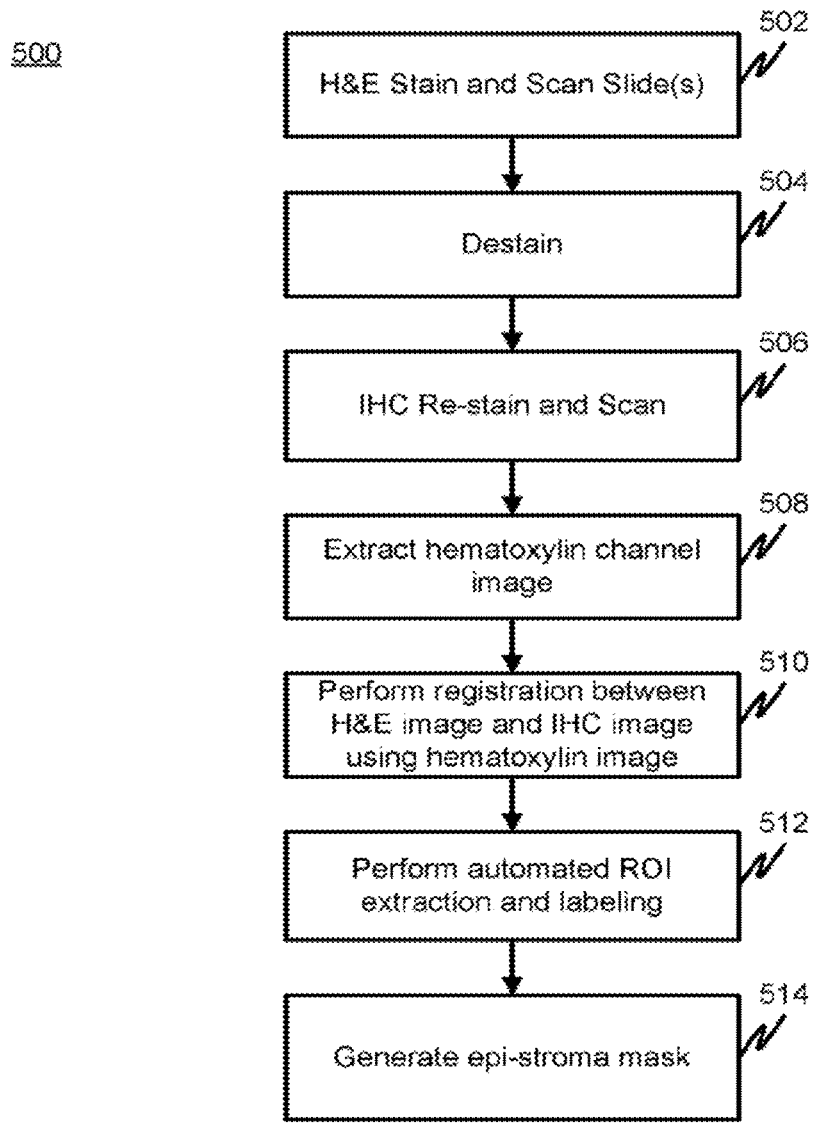
FIG. 5 is a flowchart of an example method for tissue slide image labeling in accordance with some implementations.

FIG. 5 is a flowchart of an example method for tissue slide image labeling in accordance with some implementations. Processing begins at 502, where one or more tissue slides are H&E stained and scanned as described herein. Processing continues to 504.

At 504, the slide(s) are destained. Processing continues to 506.

At 506, the slides are re-stained with an IHC marker and scanned. Processing continues to 508.

At 508, the hematoxylin channel image is extracted from IHC. Processing continues to 510.

At 510, registration between the H&E image and the IHC image using the hematoxylin channel is performed. Processing continues to 512.

At 512, automated ROI extraction and labeling is performed according to one or more techniques described herein. Processing continues to 514.

At 514, an epi-stroma mask is generated.

Figure 6:
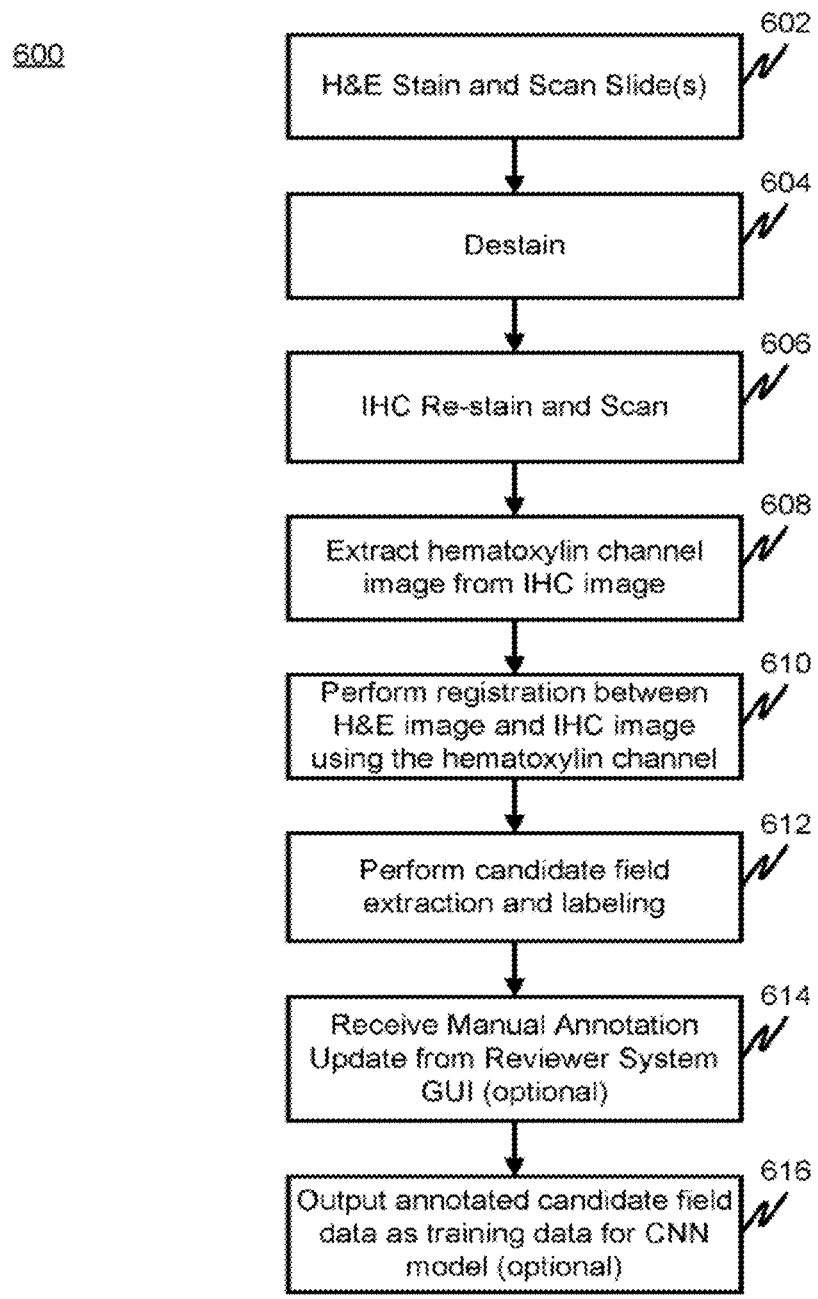
FIG. 6 is a flowchart of an example method for tissue slide image labeling in accordance with some implementations.

FIG. 6 is a flowchart of an example method for tissue slide image labeling in accordance with some implementations. Processing begins at 602, where one or more tissue slides are H&E stained and scanned as described herein. Processing continues to 604.

At 604, the slide(s) are destained. Processing continues to 606.

At 606, the slides are re-stained with an IHC marker and scanned. Processing continues to 608.

At 608, the hematoxylin channel is extracted from the IHC image. Processing continues to 610.

At 610, registration between the H&E image and the IHC image using the hematoxylin channel is performed. Registration can be performed as described herein. Processing continues to 612.

At 612, candidate field extraction (e.g., region of interest) and labeling using a mask (e.g., a PHH3 mask) is performed. For example, in some implementations, the PHH3 mask can be created from regions marked brown in IHC that are constrained to be small and cell-like. These can be used as a marker of possible mitotic figures for review by experts (either a human expert or an expert system). Processing continues to 614.

At 614, optionally, updated labels and/or comments associated with the candidate fields and/or labels can be received from a reviewer system GUI. Processing continues to 616.

At 616, optionally, the mask (e.g., PHH3 mask), labels and/or labeled objects can be provided as training data for a machine learning model, e.g., a convolutional neural network (CNN) model.

FIGS. 7-9 include diagrams of example graphical user interfaces (GUIs) that show example modes for navigating between images and performing annotations. For example, FIGS. 7 and 8 are diagrams of a GUI for an overview/browsing mode and FIG. 9 is a diagram of a GUI for a mitotic figure annotating mode. User can triage fields as accept, reject, or review using buttons on top right pane. Reject is for ROIs with bad quality or artifact like tissue being torn. Review is for future review between different experts. Users can provide input to the GUI, e.g., via keyboard up and down keys or other input, to move backward and forward between different ROIs.

In some implementations, the user is able to quickly switch between registered H&E and IHC images for the same area of tissue. In FIGS. 7 and 8, H&E for a sample of breast tissue is displayed along with an IHC of PHH3 for detecting mitotic figures.

FIG. 8 is a diagram of an example graphical user interface (GUI) for tissue slide image labeling review that shows a mode where the registered IHC image is displayed and where users can access and select images for display (e.g., by clicking the pull down menu on top left pane and selecting the desired image to display). Experts can use the IHC images to confirm if a given set of H&E pixels contain a certain structure of interest because the IHC images are stained for specific targets (e.g., cytokeratin or mitotic in brown).

The system also provides for a quick multiclass and multilabel system for each ROI. In FIGS. 7 and 8 the user can label an overall triage for the image, including Accept, Reject, or Review. They can also comment on the quality of the ROI and the IHC. In addition, the user can quickly comment if there are no mitosis. Furthermore, for each of the fields, the user can enter in freetext comments that allow the user to create new labels on demand.

FIG. 9 is a diagram of an example graphical user interface (GUI) for tissue slide image labeling review in accordance with some implementations. For example, via the GUI shown in FIG. 9, a user can drop annotation objects by picking a classification label on bottom left of screen and then click on a cell in the field of view to tag it with different labels, which can be shown as different colored rectangles.

In FIG. 9, the user is able to see in a yellow outline the results of IHC segmentation overlaid onto the H&E. This allows the user to see, based on IHC segmentation, the corresponding area on the H&E. In this case, the IHC is of PHH3 which indicates mitotic figures. Therefore, the yellow area on the H&E would indicate where a mitotic figure is.

Furthermore, the system permits the user to assign multiple classes to various objects in the image. In this example, allowed classes include: a) Abnormal mitotic; b) Mitotic; c) Borderline (mitotic); d) Regular nucleus; d) Look alike; e) Artifact; f) Telophase 1 (one nucleus of a cell dividing); g) Telophase 2 (the other nucleus of a dividing cell); h) Prophase; and/or g) Error.

With the IHC segmentation as a guide, the user can then assign these subclasses to the detected object. Furthermore, the user may also annotate additional objects that are in the scene that were either not detected in error or are not intended to be detected by the IHC but are of utility, e.g., a regular nucleus, look alike, etc.

Figure 10:
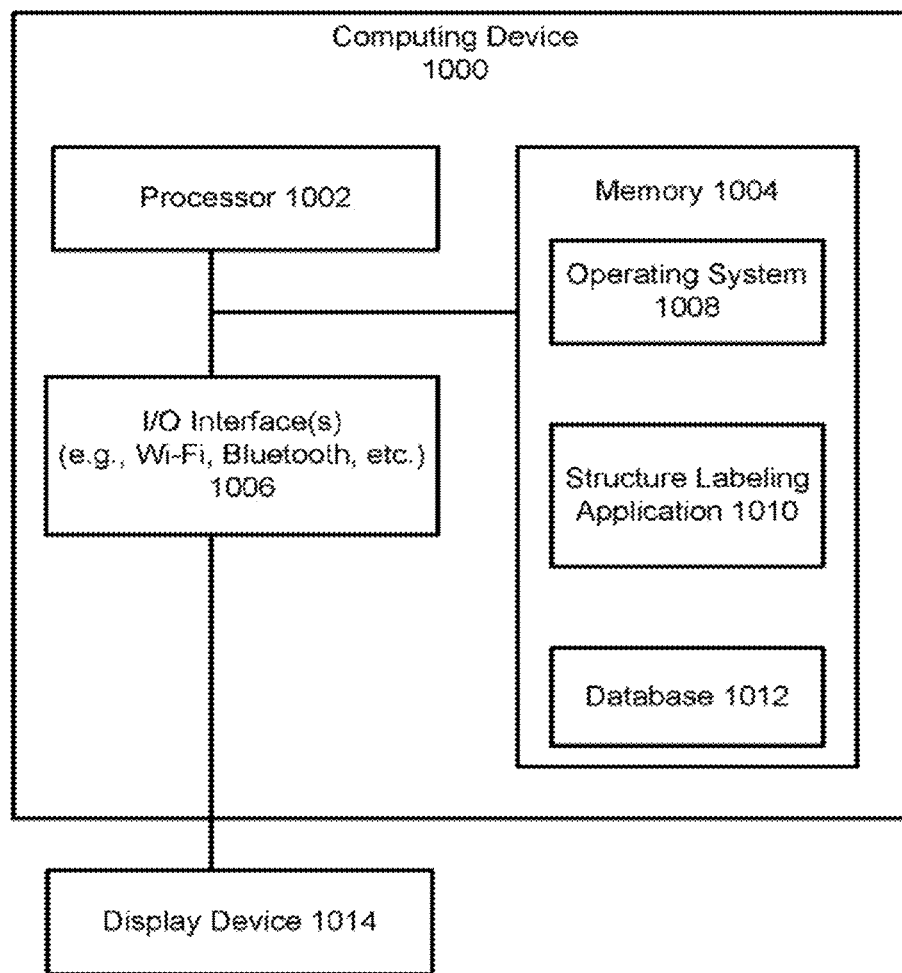
FIG. 10 is a diagram of an example system configured to perform tissue slide image labeling in accordance with some implementations.

In another embodiment, such as when ck18 is used on breast tissue for marking epithelial regions, a rich set of ROI level labels can be assigned by the user for future subclassing. Examples include: a) Marker present—indicating that there is marker present on the ROI; b) Border segmentation issues; c) Registration mismatch—the IHC and the H&E do not register—this may be due to faulty registration or differences in the tissue such as one having a tear in it; d) Lumen staining—a lumen is picking up stain where it should not be; and/or e) Weak epi—the epithelial regions are weakly staining FIG. 10 is a block diagram of an example computing device 1000 which may be used to implement one or more features described herein. In one example, computing device 1000 may be used to implement a computer device, e.g., tissue slide labeling system or reviewer system device (e.g., 106 and/or 108 of FIG. 1), and perform appropriate method implementations described herein. Device 1000 can be any suitable computer system, server, or other electronic or hardware device. For example, the device 1000 can be a mainframe computer, desktop computer, workstation, portable computer (including a smart phone or laptop), or medical device. In some implementations, device 1000 includes a processor 1002, a memory 1004, and input/output (I/O) interface 1006, all operatively coupled to each other.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 1002 and/or integrated therewith. Memory 1004 can store software operating on the server device 1000 by the processor 1002, including an operating system 1008, one or more applications 1010, e.g., a tissue slide image labeling application and application data 1020. In some implementations, applications 1010 can include instructions that, in response to execution by processor 1002, enable processor 1002 to perform or control performance of the functions described herein, e.g., some or all of the methods of FIGS. 2-6.

For example, applications 1010 can include a tissue slide image labeling application, which as described herein can provide automatic labels for tissue slide images. Any software in memory 1004 can alternatively be stored on any other suitable storage location or computer-readable medium. In addition, memory 1004 (and/or other connected storage device(s)) can store images, and other instructions and data used in the features described herein. Memory 1004 and any other type of storage (magnetic disk, optical disk, magnetic tape, or other tangible media) can be considered "storage" or "storage devices."

In various implementations, application(s) 1010 can include a machine-learning model (e.g., a two-stage neural network model including a coarse detector and a fine discriminator) that can be trained to detect cell objects in images. In some implementations, training data may include tissue slide scan data, CT image data, etc.

The model form or structure may specify connectivity between various nodes and organization of nodes into layers. For example, nodes of a first layer (e.g., input layer) may receive data as input data or application data. Such data can include, for example, one or more pixels. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be an identified and/or labeled candidate object or particular object of interest, etc. depending on the specific trained model.

In some implementations, the trained model may include a weight individual nodes and/or connections. A respective weight may be applied to a connection between each pair of nodes that are connected per the model form, e.g., nodes in successive layers of the neural network. For example, the respective weights may be randomly assigned, or initialized to default values. The model may then be trained, e.g., using data, to produce a result, where the training can include adjusting one or more of nodes, node structure, connections, and/or weights.

A model can include a loss function representing the difference between a predicted value and an actual label. The model can be trained to minimize the loss function. Training can include supervised, unsupervised, or semi-supervised learning techniques. In supervised learning, the training data can include a plurality of inputs (e.g., tissue slide images) and a corresponding expected output for each input (e.g., tissue slide images with objects or structures of interest identified and labeled). Based on a comparison of the output of the model with the expected output (e.g., computing the loss function), values of the weights are automatically adjusted, e.g., in a manner that increases a probability that the model produces the expected output when provided similar input (i.e., reduces the loss function). In unsupervised learning, models learn relationships between elements in a data set and classify raw data without the benefit of labeled training data. Semi-supervised learning can include a combination of supervised and unsupervised techniques, for example, a small amount of labeled training data and a large amount of unlabeled training data can be provided to a model for learning.

I/O interface 1006 can provide functions to enable interfacing the computing device 1000 with other systems and devices. For example, network communication devices, storage devices (e.g., memory and/or database), and input/output devices can communicate via the I/O interface 1006. In some implementations, the I/O interface 1006 can connect to interface devices including input devices (keyboard, pointing device, touchscreen, microphone, camera, scanner, etc.) and/or output devices (display device, speaker devices, printer, motor, etc.). Display device 1014 is one example of an output device that can be used to display images and other data, e.g., one or more tissue slide images, structure of interest identification, and labels provided by an application as described herein. Display device 1014 can be connected to device 1000 via local connections (e.g., display bus) and/or via networked connections and can be any suitable display device, some examples of which are described below.

For case of illustration, FIG. 10 shows one block for each of processor 1002, memory 1004, I/O interface 1006, and software blocks 1008 and 1010. These blocks may represent one or more processors or processing circuitries, operating systems, memories, I/O interfaces, applications, and/or software modules. In other implementations, device 1000 may not have all of the components shown and/or may have other elements including other types of elements instead of, or in addition to, those shown herein. While labeling system 106 is described as performing operations as described in some implementations herein, any suitable component or combination of components of system 106 or similar system, or any suitable processor or processors associated with such a system, may perform the operations described.

A user device can also implement and/or be used with features described herein. Example user devices can be computer devices including some similar components as the device 1000, e.g., processor(s) 1002, memory 1004, and I/O interface 1006. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 1014, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the methods shown in FIGS. 2-6) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processing units (or GPUs) application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer), wearable device. In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. For example, while breast cancer diagnosis or image studies are described as an example to illustrate an implementation of the disclosed subject matter, the system and methods described herein can be extended to image studies of other cancer sites, such as liver, lung, head, neck, etc. or other types of biomedical imaging for other purposes or for diagnosing other diseases.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

APPENDIX A—EXAMPLE LAB PROTOCOLS FOR PREPARING TISSUE

H & E Staining
  Cut paraffin sections (e.g., 4-5 micron thick) and place on positive (+) charged slides. Label slides, using graphite pencil with accession number (corresponding to block number).
  Bake slides at 65° C. for 60 min
  Deparaffinize in 3 changes of xylene, for 3 minutes each.
  Hydrate in descending grades of alcohol as follows:
    a. 100%, 3 changes, 10 dips in each.
    b. 95%, 3 changes, 10 dips in each.
  Wash in tap water for 1 minute.
  Stain with Harris Hematoxylin (e.g., Fisher, cat #SH30-500D), or the like, 7 minutes; wash in tap water—1 minute.
  Place slides in acid-alcohol—1-2 dips, then wash in tap water for 1 min.
  Blue in Ammonia water for 30-60 sec. Wash in tap water for 1 min.
  Dip slides in 95% alcohol.
  Place slides in Alcoholic Eosin solution (e.g., Sigma, cat #HT110116, or the like) for 2 minutes.
  Dehydrate as follows:
    a. 95% dehydrant—3 changes, 10 dips each
    b. 100% dehydrant—3 changes, 10 dips each
  Clear in 3 changes of xylene, 1 minute each
  Mount
  Dry slides overnight.
H&E Destaining
  Scan slides on Philips scanner before H&E destaining and IHC procedure
  After slides are scanned, place in clean Xylene solution and keep for 1-2 hrs to remove coverslips. Gently lift coverslips from the slides. Dip in xylene and rehydrate in descending grades of alcohol:
    a. 100%, 2 changes, 10 dips each
    b. 95%, 2 changes, 10 dips each
  Water, 3 changes, 1 minute each
  Place in PBS
  Destain H&E slides by proceeding directly to IHC staining procedure on Bond RX instrument. Bond Wash buffer and other reagents used during IHC procedure will remove H&E stain from slides. Immunohistochemistry (IHC) for Anti-Histone H3 (phospho S10+T11) antibody (e.g., Abcam, cat #ab32107), using Bond Polymer Refine Detection System (e.g., Leica, DS9800).
  Anti-histone H3 (PHH3) is a rabbit polyclonal antibody, specific for Histone 3 phosphorylated on Serine10 and Threonine 11. Phosphorylation of H3, especially at highly conserved Serine10 site is crucial for the onset of mitosis. PHH3 staining is useful to distinguish mitotic figures from other morphological changes that can sometimes mimic mitosis, such as apoptosis or necrosis.
  The Bond Polymer Refine Detection system used at PRECISE MD lab detects tissue-bound mouse and rabbit IgG and some mouse IgM primary antibodies. The detection kit is intended for staining sections of formalin-fixed, paraffin-embedded tissues on the Bond automated system. It utilizes a novel controlled polymerization technology to prepare polymeric horseradish peroxidase (HRP) linker antibody and avoids the use of streptavidin and biotin, which can cause non-specific background due to the presence of endogenous biotin. The system gives great sensitivity and signal amplification, as well as reduces or eliminates the need of including negative controls with every run.
  Place labeled slides on a slide tray, and cover with cover tiles.
  Reagent tray: Bond Polymer Refined Detection Kit (Leica); primary antibody, PHH3 (Abcam) diluted 1:2000 with 2% BSA in PBS buffer (prepared in the laboratory).
  Antigen Retrieval step: ER1, pH6 buffer (Leica, Cat #AR9961) 40 min
  Peroxidase block—5 min
  Primary antibody (Abcam, PHH3, 1:2000 dilution), 60 minutes
  Post Primary (to enhance the penetration of subsequent polymer reagent)—8 min
  Polymer (poly-HPR anti mouse/rabbit polymer)—8 min
  DAB (chromogen)—10 min
  Hematoxylin—5 min
  When run is finished, unload slides and dehydrate, clear and cover slip:
    a. 95% dehydrant—3 changes, 10 dips each
    b. 100% dehydrant—3 changes, 10 dips each
  Xylene—3 changes, 1 min each
  Mount slides with Cytoseal XYL
  Dry slides overnight
  Scan slides

What is claimed is:

1. A computer-implemented method to label structures in tissue slide images, the computer-implemented method comprising:
  generating a plurality of tissue slide images including a first tissue slide image of a first tissue slide stained with a first stain and a second tissue slide image of the first tissue slide stained with a second stain;
  performing an image registration process on the plurality of tissue slide images,
    wherein the image registration process includes minimizing a mutual information metric between deconvolved hematoxylin channels for first images of slides stained with the first stain and second images of slides stained with the second stain, where the minimizing is performed in two stages:
      at a first stage, performing a coarse, low-resolution registration of the deconvolved hematoxylin channels using global rigid and affine transforms; and
      at a second stage, performing a high-resolution registration of localized fields using affine and B-spline transforms;
  based on the image registration process, identifying one or more candidate regions of interest (ROIs) within the plurality of tissue slide images; and
  generating one or more label annotations for structures within the plurality of tissue slide images.

2. The computer-implemented method of claim 1, further comprising generating segmentation masks for the structures within the plurality of tissue slide images.

3. The computer-implemented method of claim 1, further comprising generating an epi-stroma mask that identifies epithelium and stroma regions within the plurality of tissue slide images by:
   creating an initial mask that estimates epithelial cells and separates a background from tissue within the plurality of tissue slide images;
   extracting image features from the one or more candidate ROIs;
   clustering image pixels based on the image features; and
   creating the epi-stroma mask based on the clustered image pixels.

4. The method of claim 3, wherein the epi-stroma mask identifies epithelium regions and stroma regions within the plurality of tissue slide images.

5. The computer-implemented method of claim 1, further comprising:
   receiving a manual annotation update of the one or more label annotations from a reviewer system graphical user interface; and
   providing the manual annotation update as training data for a convolutional neural network (CNN) model.

6. The computer-implemented method of claim 5, wherein the CNN model is trained to output mitotic figure candidates.

7. The computer-implemented method of claim 1, wherein identifying the one or more ROIs includes:
   identifying a hematoxylin and eosin ROI;
   extracting a first immunohistochemistry ROI based on the hematoxylin and eosin ROI;
   extracting a common channel from the first immunohistochemistry ROI and the hematoxylin and eosin ROI; and
   responsive to performing the image registration process on the plurality of tissue slide images, extracting a second immunohistochemistry ROI corresponding to the hematoxylin and eosin ROI, wherein the second immunohistochemistry ROI is smaller than the first immunohistochemistry ROI.

8. A system, comprising:
   one or more processors coupled to a computer readable memory having stored thereon software instructions that, when executed by the one or more processors, cause the one or more processors to perform or control performance of operations including:
      generating a plurality of tissue slide images including a first tissue slide image of a first tissue slide stained with a first stain and a second tissue slide image of the first tissue slide stained with a second stain;
      performing an image registration process on the plurality of tissue slide images,
         wherein the image registration process includes minimizing a mutual information metric between deconvolved hematoxylin channels for first images of slides stained with the first stain and second images of slides stained with the second stain, where the minimizing is performed in two stages:
            at a first stage, performing a coarse, low-resolution registration of the deconvolved hematoxylin channels using global rigid and affine transforms; and
            at a second stage, performing a high-resolution registration of localized fields using affine and B-spline transforms;
      based on the image registration process, identifying one or more candidate regions of interest (ROIs) within the plurality of tissue slide images; and
      generating one or more label annotations for structures within the plurality of tissue slide images.

9. The system of claim 8, wherein the operations further include generating segmentation masks for the structures within the plurality of tissue slide images.

10. The system of claim 8, wherein the operations further include generating an epi-stroma mask that identifies epithelium and stroma regions within the plurality of tissue slide images by:
   creating an initial mask that estimates epithelial cells and separates a background from tissue within the plurality of tissue slide images;
   extracting image features from the one or more candidate ROIs;
   clustering image pixels based on the image features; and
   creating the epi-stroma mask based on the clustered image pixels.

11. The system of claim 10, wherein the epi-stroma mask identifies epithelium regions and stroma regions within the plurality of tissue slide images.

12. The system of claim 10, wherein the operations further include:
   receiving a manual annotation update of the one or more label annotations from a reviewer system graphical user interface; and
   providing the manual annotation update as training data for a convolutional neural network (CNN) model.

13. The system of claim 12, wherein the CNN model is trained to output mitotic figure candidates.

14. The system of claim 10, wherein identifying the one or more ROIs includes:
   identifying a hematoxylin and eosin ROI;
   extracting a first immunohistochemistry ROI based on the hematoxylin and eosin ROI;
   extracting a common channel from the first immunohistochemistry ROI and the hematoxylin and eosin ROI; and
   responsive to performing the image registration process on the plurality of tissue slide images, extracting a second immunohistochemistry ROI corresponding to the hematoxylin and eosin ROI, wherein the second immunohistochemistry ROI is smaller than the first immunohistochemistry ROI.

15. A non-transitory computer readable medium having software instruction stored thereon that, when executed by a processor, cause the processor to perform or control performance of operations including:
   scanning one or more stained tissue slides to generate a plurality of tissue slide images including a first tissue slide image of a first tissue slide stained with a first stain and a second tissue slide image of the first tissue slide stained with a second stain;
   performing an image registration process on the plurality of tissue slide images,
      wherein the image registration process includes minimizing a mutual information metric between deconvolved hematoxylin channels for first images of slides stained with the first stain and second images of slides stained with the second stain, where the minimizing is performed in two stages:
         at a first stage, performing a coarse, low-resolution registration of the deconvolved hematoxylin channels using global rigid and affine transforms; and at a second stage, performing a high-resolution registration of localized fields using affine and B-spline transforms;

based on the image registration process, identifying one or more candidate regions of interest (ROIs) within the plurality of tissue slide images; and generating one or more label annotations for structures within the plurality of tissue slide images.

16. The non-transitory computer readable medium of claim 15, wherein the operations further include generating an epi-stroma mask that identifies epithelium and stroma regions within the plurality of tissue slide images by:

creating an initial mask that estimates epithelial cells and separates a background from tissue within the plurality of tissue slide images;

extracting image features from the one or more candidate ROIs;

clustering image pixels based on the image features; and creating the epi-stroma mask based on the clustered image pixels.

17. The non-transitory computer readable medium of claim 16, wherein the epi-stroma mask identifies epithelium regions and stroma regions within the plurality of tissue slide images.

18. The non-transitory computer readable medium of claim 15, wherein the operations further include:

receiving a manual annotation update of the one or more label annotations from a reviewer system graphical user interface; and providing the manual annotation update as training data for a convolutional neural network (CNN) model.

19. The non-transitory computer readable medium of claim 18, wherein the CNN model is trained to output mitotic figure candidates.

20. The non-transitory computer readable medium of claim 15, wherein identifying the one or more ROIs includes:

identifying a hematoxylin and eosin ROI;

extracting a first immunohistochemistry ROI based on the hematoxylin and eosin ROI;

extracting a common channel from the first immunohistochemistry ROI and the hematoxylin and eosin ROI; and responsive to performing the image registration process on the plurality of tissue slide images, extracting a second immunohistochemistry ROI corresponding to the hematoxylin and eosin ROI, wherein the second immunohistochemistry ROI is smaller than the first immunohistochemistry ROI.

* * * * *